Figure 1:
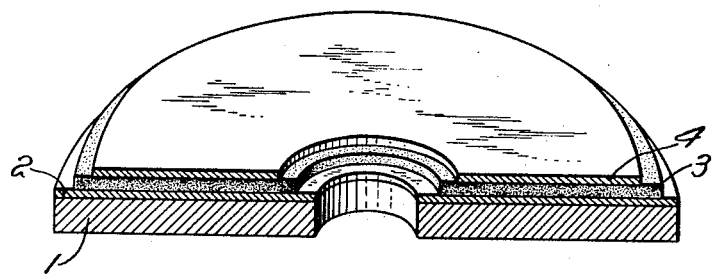

Dec. 1, 1959  D. F. ALLISON  2,915,687
ELECTROFORMING OF SEMICONDUCTIVE CELLS
Filed Dec. 1, 1953

INVENTOR
DAVID F. ALLISON
BY
ATTORNEY

United States Patent Office

2,915,687
Patented Dec. 1, 1959

2,915,687

ELECTROFORMING OF SEMICONDUCTIVE CELLS

David F. Allison, New York, N.Y., assignor to International Telephone and Telegraph Corporation, Nutley, N.J., a corporation of Maryland Application December 1, 1953, Serial No. 395,359

12 Claims. (Cl. 317—241)

This invention relates to semiconductive cells and to methods of making them and is particularly concerned with the electrical formation of dry rectifiers, such as selenium rectifiers.

Dry-disk elements, whether of the selenium, copper oxide, magnesium-copper sulfide, germanium or similar types, commonly require an electroforming treatment in order to develop a high degree of electrical asymmetry, which results in these elements functioning satisfactorily as electric rectifiers. It has been found that particularly in the case of selenium rectifiers, the process of electrical formation is an important and integral step for preparing a rectifier with satisfactory electrical characteristics, particularly the ability to withstand high voltages.

Considerable confusion has existed heretofore as to the proper method for electrically processing selenium rectifiers. The prevailing view and current practice in this art are that the electrical formation of such rectifiers must be carried out at relatively low temperatures such as at room temperatures. A temperature of 70° C. is considered the maximum desirable temperature in order not to unnecessarily degrade the conducting ability of the selenium rectifier in the low-resistance direction. In addition, selenium rectifiers as currently manufactured employ a relatively low-melting counter-electrode composition, generally applied by spraying. Thus, a typical composition used is Wood's metal, an alloy containing approximately 50% bismuth, 25% lead, 12.5% cadmium and 12.5% tin and having a melting point of about 65.5° C. Another counter-electrode composition commonly used, having a melting point of approximately 103° C., consists of an alloy of 53% bismuth, 21% cadmium and 26% tin. Another alloy suggested for use as a counter electrode consists of 75% tin and 25% cadmium and has a melting point of 165° C.

Conventional rectifiers produced in the foregoing manner are found to be severely limited with respect to their current-carrying capacity, their ability to withstand high voltages in the blocking or reverse direction, and their ability to operate at relatively elevated temperatures. While an attempt has been made heretofore to improve selenium rectifiers by treating them with direct current at a temperature of 155° C., this method has failed to produce high-voltage rectifiers.

It is an object of the present invention, therefore, to provide a selenium rectifier cell capable of withstanding voltages under normal service conditions in excess of 50 volts.

It is a further object to provide such a rectifier having a current-carrying capacity at least double that of existing selenium rectifiers.

It is an additional object of the present invention to provide a selenium rectifier capable of operation at elevated temperatures above 150° C.

It is still a further object to provide a method for the electrical formation of dry-disk rectifiers, and particularly selenium rectifiers, that will result in producing rectifiers having improved current-carrying capacity, high-voltage properties, and high-temperature-operating characteristics.

It is a feature of this invention that a semiconductive cell, such as a dry-disk selenium rectifier, for example, is treated at an elevated temperature approaching the melting point of the active semiconductive element while at the same time passing current therethrough in the high-resistance direction.

It is an additional feature that the electric current passed through the rectifier element may be of sufficient intensity as to serve to elevate the temperature of the rectifier element to the desired value.

Figure 2:
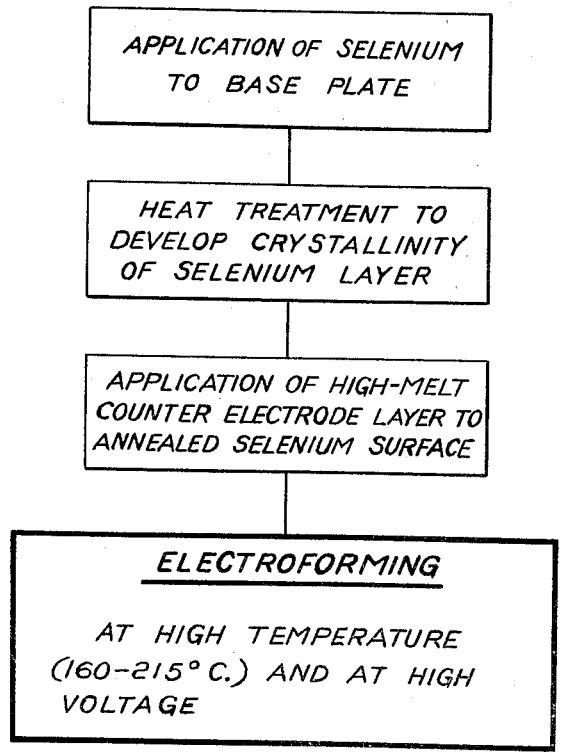

The above-mentioned and other features and objects of this invention will become more apparent by reference to the following description taken in conjunction with the accompanying drawings, in which:

Fig. 1 represents a cross section of a rectifier showing one embodiment of the invention; and Fig. 2 represents a flow chart of the essential features of one embodiment of the process of this invention, with particular reference to a selenium rectifier.

For purposes of illustration, the processing of a typical selenium rectifier as embodied in Figs. 1 and 2 will be described hereinafter in greater detail.

In Fig. 1 the base plate element 1 may consist of any of the various metals used for this purpose; thus, iron, magnesium, aluminum, nickel or bismuth may be used for the purposes of this invention. In general, I prefer to use an aluminum base plate because of its light weight and good heat and electrical conductivity. This base plate is suitably cleaned and etched and then preferably plated with a layer 2 of nickel. Upon this plated base plate is then deposited a layer of highly purified selenium 3 by any of the methods commonly employed. Thus it has been suggested that the base plate be heated above the melting point of selenium and a stick of selenium be rubbed over the surface of the base plate. Another proposal has been to have pellets of selenium melted while on the base plate and then spread thereon. Still another procedure has been to dip the base plate in molten selenium and remove the excess from the base plate by centrifugally spinning the base plate. Vacuum evaporation of selenium has also been employed for deposition of the selenium on the base plate. I have found that while any of these methods may be employed herein, the method consisting of dusting the base plate with powdered selenium and then pressing the selenium onto the surface of the base plate by means of heat and pressure is preferable. Thus, the selenium may be made to adhere satisfactorily to the base plate by sprinkling the powdered selenium upon the cold base plate and then heat treating this plate in a known manner at a temperature between 100° C. and 150° C. while applying pressure thereto. While the selenium may be used in the pure state without the addition of additives, I have found that the addition of various halogens either in the elemental state or as compounds in any of their various salts, such as cerium bromide, selenium iodide, selenium monochloride or the like is useful in improving the conductivity of the selenium in the forward-conducting direction. Also, in various embodiments of this invention, the in situ formation of a selenide layer between the nickel and selenium surface may be useful in improving the desired electrical properties of the finished rectifier.

The selenium is essentially in the amorphous state following its deposition on the base plate and in order to increase the crystallization of the selenium and convert it thereby to its more conductive variety an annealing step is necessary. While this annealing step may be performed after deposition of a counter-electrode layer upon the free surface of the amorphous selenium, I have found that more satisfactory results are obtained by first annealing the selenium surface. Possibly, this is because crystallization of the selenium may be promoted by the presence of water vapor or other constituents normally present in the atmosphere in which the heat-treating step is performed. Generally speaking this annealing is accomplished by heating the selenium at a temperature above 150° C. in order to accelerate the rate of crystallization. At a temperature of 150° C. several hours of heat treatment for obtaining satisfactory crystallization may be required. Where more elevated temperatures are used, below but close to the melting point of selenium, the time required for conversion of the selenium to its more conductive variety is correspondingly reduced. Thus, a treatment at 210° C. for a half hour is usually sufficient for producing the desired degree of crystallinity.

Following this annealing treatment, a genetic insulating layer if desired may be formed on the selenium surface or an artificial nongenetic barrier layer may be deposited thereon, either by dipping, spraying, evaporation, centrifugal spinning or the like. Because of the elevated temperatures employed during the subsequent electroforming process, it is important that if a barrier layer is used, whether of an organic or inorganic nature, it must be capable of withstanding these high temperatures. As my preferred embodiment for forming a selenium rectifier in accordance with the process of this invention, I omit the application of a barrier layer and proceed with the deposition of a counter-electrode layer on the selenium layer.

It is one of the features of this invention, in order to successfully perform the subsequent electroforming treatment, that the counter-electrode layer 4 applied to the free surface of the selenium following the annealing treatment be one having a relatively high melting point. Thus, the alloys commonly employed as counter electrodes for selenium rectifiers such as Wood's metal and other low-melting alloys are unsuitable for the purposes of this invention. I have found it desirable to use a metal or alloy having at least a melting point of 200° C., and preferably well above the melting point of selenium. Thus, such suitable metals and alloys include substantially pure cadmium, bismuth, and zinc; high-melting cadmium alloys such as cadmium-tin alloys; cadmium containing traces of thallium, lead, bismuth or zinc; zinc containing traces of cadmium; and the like. While not all pure metals and alloys having melting points above 200° C. are suitable for use in this invention, I have found that in several instances metals considered unsuitable for use as counter electrodes may be rendered more suitable by incorporating in them various proportions of cadmium. Also, various methods of applying the counter-electrode composition other than spraying, such as mechanical pressing, cathodic sputtering, electrodeposition, and vacuum evaporation or deposition have been suggested.

However, I have found that while the above-listed metals and alloys and methods may be considered for the purposes of this invention, not all are equally efficient, and I prefer to use substantially pure cadmium as is ordinarily commercially available. Thus the application of cadmium as the counter-electrode composition is a direct and relatively simple procedure and yields highly satisfactory results. While it has been suggested that cadmium metal may be applied by a process referred to as Schoop spraying, the use of vacuum evaporation for deposition of the cadmium layer is more reliable and preferable for ease of application and control of the thickness of the counter-electrode layer, and also results in rectifier cells having improved electrical characteristics.

While a semiconductive cell processed in accordance with the foregoing procedure shows asymmetric properties and may be used as a rectifier, it can withstand only low voltages, such as approximately 10 volts, has poor efficiency, and allows an excessive leakage of current in the blocking or high-resistance direction. To properly convert such a cell to a more efficient unit and one commercially usable, it is necessary to subject it to an electrical formation process. Various methods of electrical formation have been proposed and used and while I have found that not all are equally desirable or equally suitable, most are nonetheless usable for the purposes of this invention. Thus the passage, in the blocking or high-resistance direction, of alternating current, direct current or pulsating direct current is suitable for my purposes. I have further found that whether the process of electrical formation is carried out under conditions of constant current, constant voltage, or constant power is not material to the purposes of this invention. The important feature of this invention is that the process of electrical formation used, as indicated in the foregoing, be carried out at a temperature below, but in relatively close proximity to, the melting point of the semiconductive layer of the rectifier cell. For processing selenium rectifiers, it is my preference to maintain the rectifiers being electrically formed in a constant-temperature bath or "heat sink" maintained at a temperature above 160° C. and below the melting point of the selenium layer. Maintaining the temperature of this heat sink at 180° C. is preferred, inasmuch as the actual temperature of the selenium layer may be somewhat higher than that of the bath temperature, although below the melting point of selenium, nominally considered as 217° C. Any of various modifications may be made in order to obtain such a constant-temperature heat sink, and while I prefer to keep the rectifier within a container maintained in a constant-temperature oil bath, a thermostatically controlled air chamber may be used as well as many other equivalent mechanical arrangements. The rectifiers may also be processed in an oil bath if proper precautions are taken to exclude adventitious contaminants. After the rectifier has been brought to the desired temperature, such as 180° C., a voltage such as, for example, a pulsating direct voltage, is applied to the rectifier in such a direction so as to pass current through the rectifier in its reverse, blocking or high-resistance direction. This applied voltage is relatively low, approximately 10 volts, and is gradually increased at a rate, for instance, of 5 volts for each 15 minutes of forming time until a voltage of at least 50 volts has been obtained. I have found that in various of the rectifiers processed by this method a voltage of as high as 100 volts R.M.S. (140 volts peak) may be applied to the rectifier plate without breakdown or melting of the semiconductive layer. After the desired voltage has been applied, the rectifiers are allowed, in a preferred embodiment, to "soak" for about one or more hours at this voltage. With increased soaking time at this elevated temperature I have found that the leakage current in the blocking direction gradually diminishes to an extremely low value. Thus, for example, selenium cells processed in accordance with this invention have been found, while passing a standard current in the forward-conducting direction of at least 320 milliamperes per square inch of rectifying surface for a full wave single phase rectifier, capable of withstanding an applied voltage of 100 volts R.M.S. at a temperature of 100° C. while allowing a reverse current leakage of only 15 milliamperes D.C.

As an alternative form of this invention, I have found that I may raise the rectifier to the desired temperature by gradually increasing the voltage applied to the rectifier and thereby increasing the heating of the rectifier disk. However, I have found that the prior heating of the rectifier by maintaining it in a heat sink allows for the obtaining of more uniform and reproducible results.

The electroformed rectifiers processed in accordance with the foregoing method are unique in their electrical properties insofar as conventional selenium rectifiers are concerned. For instance, conventional selenium rectifiers become less efficient and are degraded in their electrical properties the higher the temperature at which they are used; consequently, a derating factor is applied to such rectifiers whenever they are used at temperatures elevated above room temperature. Furthermore, the low-melting counter-electrode compositions used further restrict the use of such rectifiers at elevated temperatures. However, the rectifiers resulting from this invention are actually improved by being operated at elevated temperatures; thus they are eminently suited for operation at temperatures as high as 150° C. at their full rated values. This offers the unique advantage that with increased temperature operation these rectifiers become more efficient in performance. These rectifiers can operate at more highly elevated temperatures than is possible with conventional selenium rectifiers because they are capable of a wattage dissipation which would ordinarily destroy the utility of conventional selenium rectifiers. As a consequence, these rectifiers may be uniquely operated at more than double the current-carrying capacity of selenium rectifiers processed according to conventional methods. Furthermore, the ordinary selenium rectifier breaks down at voltages above 26 volts; in special instances voltages of approximately 36 volts may be withstood. However, the rectifiers processed in accordance with this invention are capable of normal operation at above 50 volts R.M.S. and have been found capable of withstanding applied electromotive forces as high as 100 volts.

While I have described above the principles of my invention in connection with specific materials and method steps, it is to be clearly understood that this description is made only by way of example and not as a limitation to the scope of my invention as set forth in the objects thereof and in the accompanying claims.

I claim:

1. A method of producing a dry plate element having a selenium layer, which includes applying a counter electrode having a melting point above 200° C. to said layer and subsequently heating said dry plate element to a given temperature, passing an electric current through said heated element while simultaneously separately maintaining said element at said given temperature, said given temperature being included in a temperature range above 175° C. to within 2° C. of the melting point of said selenium.

2. A method according to claim 1 wherein an electromotive force of at least 50 volts is applied to the element in the high resistance direction.

3. A method according to claim 1 wherein the counter electrode applied to the selenium layer is selected from the group consisting of cadmium and alloys thereof.

4. A method according to claim 1 wherein the counter electrode is deposited by vacuum evaporation and consists essentially of cadmium.

5. A method according to claim 4 wherein an electromotive force is applied to the element in the reverse direction, said electromotive force being gradually increased until it attains a value of at least 80 volts.

6. The process of making selenium units operable at temperatures above 150° C. which comprises the successive steps of depositing a layer of selenium on a metallic plate, annealing said selenium-coated plate, depositing a metallic contact layer thereon and thereafter applying a voltage across the selenium in a direction tending to send current in the high resistance direction while maintaining the temperature of said unit at above 160° C., said voltage having an initial value below the maximum which said unit must stand in the reverse current direction in service, and being gradually raised to a value higher than said maximum.

7. The process according to claim 6 wherein said contact layer comprises cadmium.

8. The process according to claim 7 wherein said temperature is maintained between 170° C. and 215° C.

9. The process according to claim 8 wherein said applied voltage is raised to a value of at least 80 volts.

10. In a process of manufacturing a cell having a semiconductive layer, the method of electrically forming the cell, comprising heating said cell to a given temperature, passing an electric current through said cell in the high resistance direction while maintaining the temperature of said cell within a range from about 2° C. to about 57° C. below the melting temperature of the semiconductive layer.

11. A method of producing a dry plate element having a selenium layer, which includes applying a counter-electrode having a melting point above 200° C. by depositing cadmium by vacuum evaporation on said layer and subsequently heating said dry plate element to a given temperature, passing an electric current through said heated element at electromotive force of at least 50 volts in a high resistance direction for at least one hour while simultaneously separately maintaining said element at said given temperature, said given temperature being above 160° C.

12. A selenium rectifier element comprising a metallic base plate, a layer of selenium deposited thereon, and a counterelectrode layer having a melting point above 200° C. deposited on the free surface of said selenium at a temperature between 170° C. and 215° C., said rectifier element having been electrically formed by being subjected to a temperature of at least 160° C. while passing electric current therethrough in the high resistance direction.

References Cited in the file of this patent

UNITED STATES PATENTS

| 2,193,610 | Wilson | Mar. 12, 1940 |
| 2,464,066 | Addink et al. | Mar. 8, 1949 |
| 2,497,649 | Amsden | Feb. 14, 1950 |
| 2,510,322 | Shearer | June 6, 1950 |
| 2,610,386 | Saslaw | Sept. 16, 1952 |

FOREIGN PATENTS

| 902,868 | France | Sept. 14, 1945 |
| 606,763 | Great Britain | Aug. 19, 1948 |